(12) United States Patent
Kim

(10) Patent No.: US 7,685,533 B2
(45) Date of Patent: Mar. 23, 2010

(54) METHOD AND APPARATUS FOR NAVIGATING A MENU IN A DISPLAY UNIT OF AN ELECTRONIC DEVICE

(75) Inventor: Huhn Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 548 days.

(21) Appl. No.: 11/280,133

(22) Filed: Nov. 15, 2005

(65) Prior Publication Data

US 2006/0107237 A1    May 18, 2006

(30) Foreign Application Priority Data

Nov. 15, 2004  (KR)  ................ 10-2004-0093163

(51) Int. Cl.
    *G06F 3/048* (2006.01)
(52) U.S. Cl. ................ 715/844; 715/810; 715/829; 715/830; 715/828
(58) Field of Classification Search ........ 715/810, 715/844, 814, 817, 818, 819, 820, 821, 822, 715/823, 828, 829, 830; 455/566, 556
    See application file for complete search history.

(56) References Cited

U.S. PATENT DOCUMENTS

| | | | | | |
|---|---|---|---|---|---|
| 5,854,629 | A | * | 12/1998 | Redpath | .............. 715/830 |
| 5,892,475 | A | * | 4/1999 | Palatsi | .............. 715/810 |
| 6,049,336 | A | * | 4/2000 | Liu et al. | .............. 715/830 |
| 2003/0013493 | A1 | * | 1/2003 | Irimajiri et al. | .............. 455/566 |
| 2003/0043207 | A1 | * | 3/2003 | Duarte | .............. 345/810 |
| 2004/0100479 | A1 | * | 5/2004 | Nakano et al. | .............. 345/700 |
| 2004/0160463 | A1 | * | 8/2004 | Battles et al. | .............. 345/814 |
| 2006/0242596 | A1 | * | 10/2006 | Armstrong | .............. 715/786 |

FOREIGN PATENT DOCUMENTS

| | | |
|---|---|---|
| JP | 01-200285 | 8/1989 |
| JP | 2000187543 | 7/2000 |
| JP | 2002141997 | 5/2002 |
| JP | 2004-118434 | 4/2004 |

* cited by examiner

*Primary Examiner*—Weilun Lo
*Assistant Examiner*—Rashedul Hassan
(74) *Attorney, Agent, or Firm*—Lee, Hong, Degerman, Kang & Waimey

(57) ABSTRACT

A method and apparatus for navigating a menu shown on a display unit of an electronic device is provided. By measuring a time for moving a cursor on the menu and determining whether the measured cursor input time exceeds a pre-set threshold, one or more cursor moving methods may be applied in order to increase user convenience.

20 Claims, 5 Drawing Sheets

METHOD AND APPARATUS FOR NAVIGATING A MENU IN A DISPLAY UNIT OF AN ELECTRONIC DEVICE

CROSS-REFERENCE TO RELATED APPLICATIONS

Pursuant to 35 U.S.C. §119(a), this application claims the benefit of earlier filing date and right of priority to Korean Application No. 93163/2004, filed on Nov. 15, 2004, the contents of which is hereby incorporated by reference herein in its entirety.

BACKGROUND OF THE INVENTION

1. Field of the Invention

The present invention relates to menu navigation of a display unit of an electronic device, and specifically, to a method and apparatus for navigating a menu in a display unit of an electronic device in a manner that improves user convenience.

2. Description of the Related Art

Recently, mobile communication terminals have incorporated various additional functions in addition to a phone communication function. For example, functions such as a camera function, an MP3 (MPEG Audio Layer 3) player function, an Internet function and an SMS (Short Message Service) function have been provided. Furthermore, the shape of mobile communication terminals and user interfaces (UI) are being designed in consideration of these additional functions.

Due to their small size, electronic devices such as mobile communication terminals, digital cameras, camcorders and MP3 players are provided with relatively small display units and the various functions are provided using such small display units. In order to use the various functions, a user can view displayed information, such as a list, menu or graphics user interface (GUI), on the small display unit and can select a desired item by moving a cursor in the display menu, or, in other words, by performing menu navigation.

There are a variety of conventional methods for moving a cursor in a menu displayed on a display unit. Some of the various conventional methods are described with reference to FIGS. 1A to 1C. FIGS. 1A to 1C are illustrations of conventional cursor moving methods that can be used for a display unit of an electronic device.

FIG. 1A illustrates a "moving body" cursor moving method in which a cursor is fixed at the center of a menu displayed on a display unit and the menu is moved up and down. The "moving body" method is disadvantageous in that the cursor moves in a direction that is opposite to a direction that the menu moves because the menu moves upwardly when a user presses a down direction key and this may confuse the user.

FIG. 1B illustrates a "moving cursor via pages" cursor moving method in which a menu is divided into several pages and displayed and a cursor can move up and down only within a single displayed page at a time. However, the "moving cursor via pages" method is disadvantageous in that it cannot provide continuity between items of the menu because the page is changed while the cursor moves to an item of a second page from an item within a first page.

FIG. 1C illustrates a "moving cursor" cursor moving method in which a cursor is moved up and down within a menu, regardless of pages. However, the "moving cursor" method is disadvantageous in that it is difficult to predict what is going to be the next item displayed because the cursor is fixed to the last line of a display unit before the last item of a displayed the page is replaced with the next item of the next displayed page.

As described so far, the conventional methods for navigating a menu shown on a display unit of an electronic device may confuse the user because of the above-identified disadvantages. Therefore, there is a need for a method and apparatus for navigating a menu shown on a display unit of an electronic device that reduces user confusion. The present invention addresses this and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to provide a method and apparatus for navigating a menu in a display unit of an electronic device in a manner that improves user convenience. The time that is takes for a cursor on a displayed menu is determined and, if the time exceeds a predetermined threshold, a different cursor moving method is employed in order to present a display that reduces user confusion. Therefore, an object of the present invention is to provide a method and apparatus for navigating a menu in display unit of an electronic device capable of improving user convenience during menu navigation by measuring the time it takes to move a cursor on a displayed menu and apply one or more cursor moving methods according to the measured cursor moving time.

In one embodiment of the present invention, a method for navigating a menu in a display of an electronic device is provided. The method includes measuring a time for moving a cursor on the display for a first cursor moving method and either maintaining the first cursor moving method or applying a second cursor moving method according to whether the measured time exceeds a predetermined threshold.

Preferably, the menu has a plurality of items and the cursor is an indicator that indicates one of the items. It is contemplated that the items may be arranged either vertically or horizontally.

The second cursor moving method is applied if the measured time exceeds the predetermined threshold and the first cursor moving method is maintained if the measured time does not exceed the predetermined threshold. Preferably, the second cursor moving method is applied and the first cursor moving method is re-applied sequentially when the measured time exceeds the predetermined threshold.

It is contemplated that the first cursor moving method and second cursor moving method are a moving cursor method, a moving body method or a moving cursor via pages method. The moving cursor method enables the cursor to be moved vertically or horizontally on the menu. The moving body method enables the cursor to be fixed at a center region of the menu as the menu is moved vertically or horizontally. The moving cursor via pages method divides the menu into a plurality of pages and enables the cursor to be moved vertically or horizontally within one of the plurality of pages.

In one preferred embodiment, the first cursor moving method is the moving cursor method and the second cursor moving method is the moving body method. In another preferred embodiment, the first cursor moving method is the moving cursor via pages method and the second cursor moving method is the moving body method.

In another embodiment of the present invention, a method for navigating a menu in a display of an electronic device is provided. The method includes applying a default cursor moving method when a user selects a menu for display, measuring a time for moving a cursor on the display according to the default cursor moving method and either maintaining the default cursor moving method or applying a different cursor moving method according to whether the measured time exceeds a predetermined threshold such that the second cursor moving method positions an item on the display on which the cursor is located at a center region of the display.

Preferably, the menu has a plurality of items and the cursor is an indicator that indicates one of the items. It is contemplated that the items may be arranged either vertically or horizontally.

The different cursor moving method is applied if the measured time exceeds the predetermined threshold and the default cursor moving method is maintained if the measured time does not exceed the predetermined threshold. Preferably, the different cursor moving method is a moving body method and the default cursor moving method is either a moving cursor method or a moving cursor via pages method. The moving cursor method enables the cursor to be moved vertically or horizontally on the menu. The moving body method enables the cursor to be fixed at a center region of the menu as the menu is moved vertically or horizontally. The moving cursor via pages method divides the menu into a plurality of pages and enables the cursor to be moved vertically or horizontally within one of the plurality of pages.

In another embodiment of the present invention, an apparatus for navigating a menu in a display of an electronic device is provided. The apparatus includes a display unit adapted to display information and a cursor on the display, an input unit adapted to receive inputs from a user and to control movement of the cursor on the display and a processor adapted to measure a time it takes the user to move the cursor for a first cursor moving method and either maintain the first cursor moving method or apply a second cursor moving method according to whether the measured time exceeds a predetermined threshold.

Preferably, the processor is further adapted to apply the first cursor moving method when a user selects a menu for display. It is contemplated that the display unit is further adapted to display the menu with a plurality of items and the cursor as an indicator that indicates one of the items such that the user may distinguish a specific one of the items from other items.

Preferably, the processor is further adapted to control the display unit such that the cursor is displayed at a central portion of the display. It is contemplated that the display unit is further adapted to display the items either vertically or horizontally.

Preferably, the display unit is further adapted to display the cursor as a highlighted portion of the menu. It is contemplated that the input unit is further adapted to receive either audible inputs or tactile user inputs.

The processor applies the second cursor moving method if the measured time exceeds the predetermined threshold and maintains the first cursor moving method if the measured time does not exceed the predetermined threshold. Preferably, the processor is further adapted to apply the second cursor moving method and re-apply the first cursor moving method sequentially when the measured time exceeds the predetermined threshold.

Preferably, the processor selects the first cursor moving method and second cursor moving method as a moving cursor method, a moving body method or a moving cursor via pages method. The moving cursor method enables the cursor to be moved vertically or horizontally on the menu. The moving body method enables the cursor to be fixed at a center region of the menu as the menu is moved vertically or horizontally. The moving cursor via pages method divides the menu into a plurality of pages and enables the cursor to be moved vertically or horizontally within one of the plurality of pages.

In one preferred embodiment, the processor is adapted to select the moving cursor method as the first cursor moving method and the moving body method as the second cursor moving method. In another preferred embodiment, the processor is adapted to select the moving cursor via pages method as the first cursor moving method and the moving body method as the second cursor moving method.

The foregoing and other objects, features, aspects and advantages of the present invention will become more apparent from the following detailed description of the present invention when taken in conjunction with the accompanying drawings.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a method and apparatus for navigating a menu in a display unit of an electronic device in a manner that improves user convenience by applying a different cursor moving method according to a measurement of the time it takes to move a cursor on a displayed menu. Although the present invention is illustrated with respect to an electronic device, it is contemplated that the present invention may be utilized anytime it is desired to increase user convenience when navigating a menu in a display unit of any device.

Reference will now be made in detail to the embodiments of the present invention, examples of which are illustrated in the accompanying drawings.

Figure 1A:
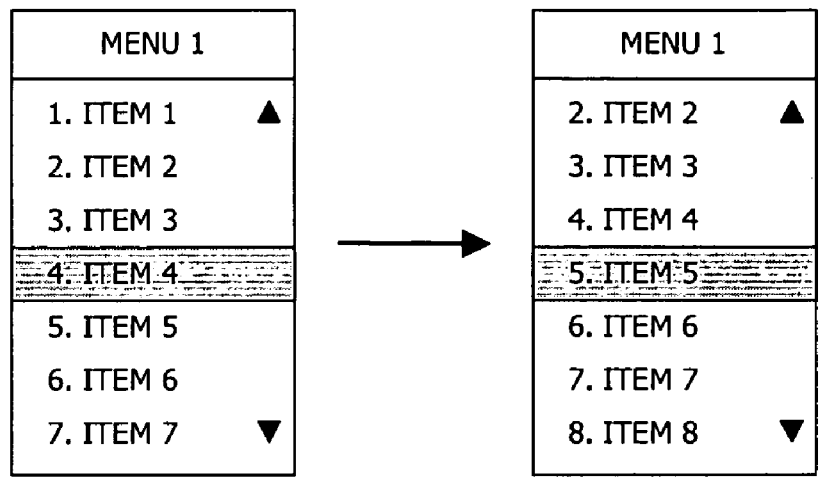
FIGS. 1A to 1C illustrate views for describing conventional cursor moving methods used for a display unit of an electronic device.
Figure 1B:
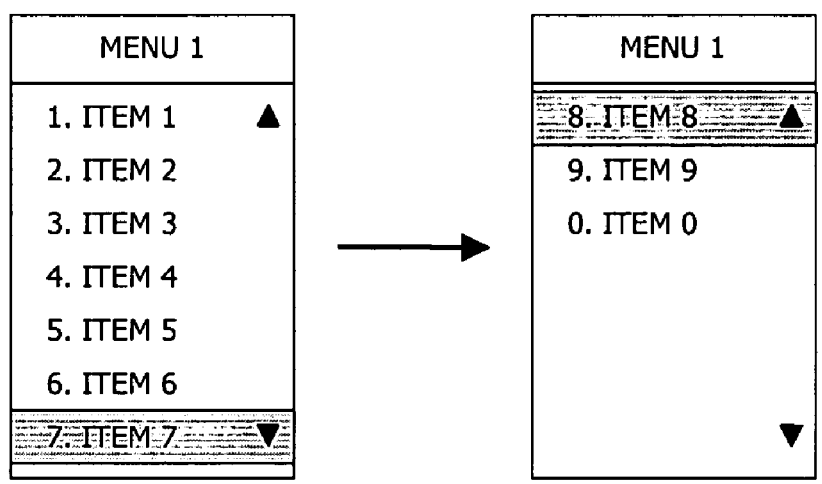
Figure 1C:
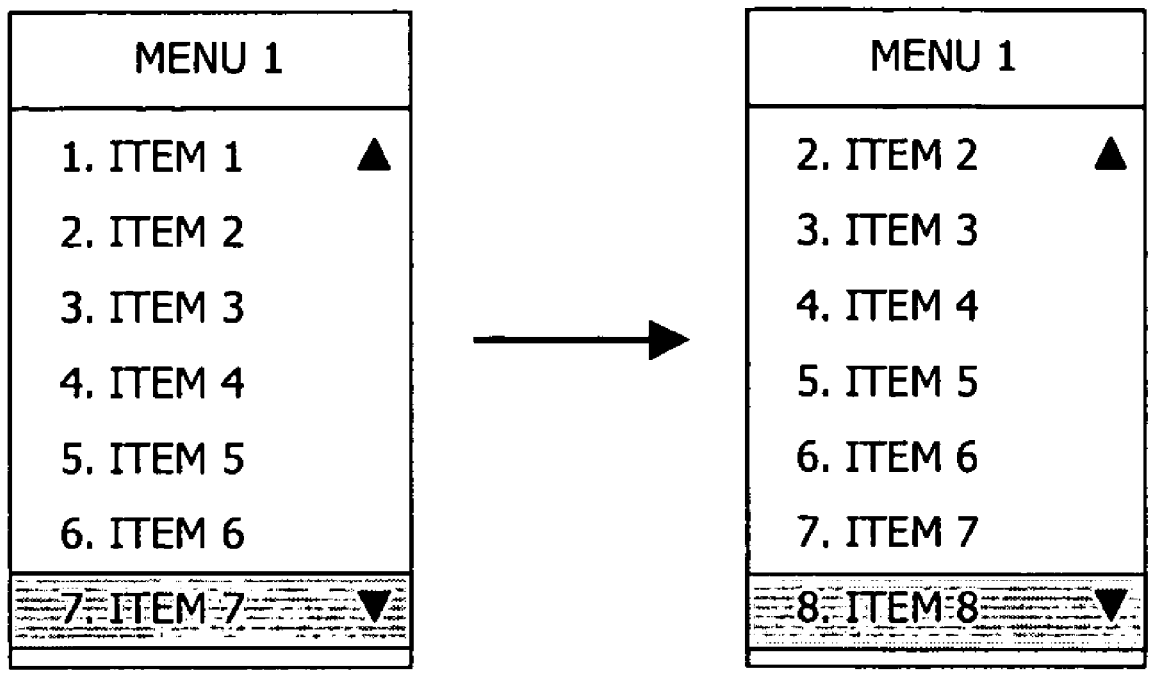
Figure 2:
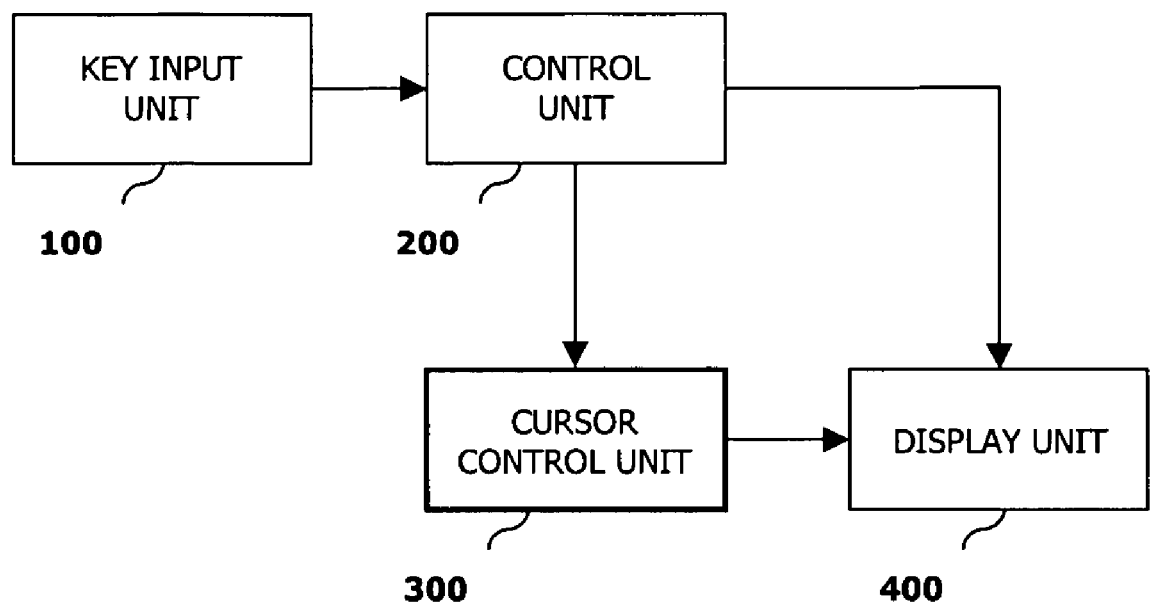
FIG. 2 is a block diagram that illustrates an exemplary device for navigating a menu in a display unit of an electronic device in accordance with the present invention.

FIG. 2 is a block diagram that illustrates an exemplary device for navigating a menu in a display unit of an electronic device in accordance with the present invention. As illustrated, the device includes a key input unit 100 adapted to input a direction key for moving a cursor on a menu, a control unit 200 adapted to measure and output the time it takes to input the direction key or other input means and the time it takes to move a cursor, a cursor control unit 300 adapted to determine a cursor moving method, such as a menu navigation procedure, based on the determined cursor moving time and a predetermined (pre-set) threshold, and a display unit 400 adapted to display a menu containing information. The electronic device may be a mobile phone, a handset, a PDA, or any other electronic device.

It is contemplated that the a key input unit 100 may be adapted to receive other tactile inputs from the user, such the pressing of buttons or touch-screen selection, or audible inputs, such as voice commands. The cursor refers to an indicator for indicating an item selected on a menu having one or more items displayed. The cursor may be in the form of a graphic icon, such as an arrow, or in the form of a distinctive indication, such as a highlighted portion, or any other type of graphical depiction that is displayed.

A pre-set threshold for comparison of the time it takes to move the cursor can be based upon a cognitive psychology theory that takes into account a total time obtained by adding together the following time durations: about 0.1 seconds needed for a user to have an intention to move a cursor, about 0.25 seconds needed for pressing a key, about 0.17 seconds needed for recognizing that the cursor has been moved, and about 0.28 seconds needed for pressing a subsequent key. Therefore, the threshold is preferably set to be longer than about 0.8 seconds, which is the result obtained upon adding these time durations. However, it can be clearly understood that other particular time durations may be used as desired.

Figure 3:
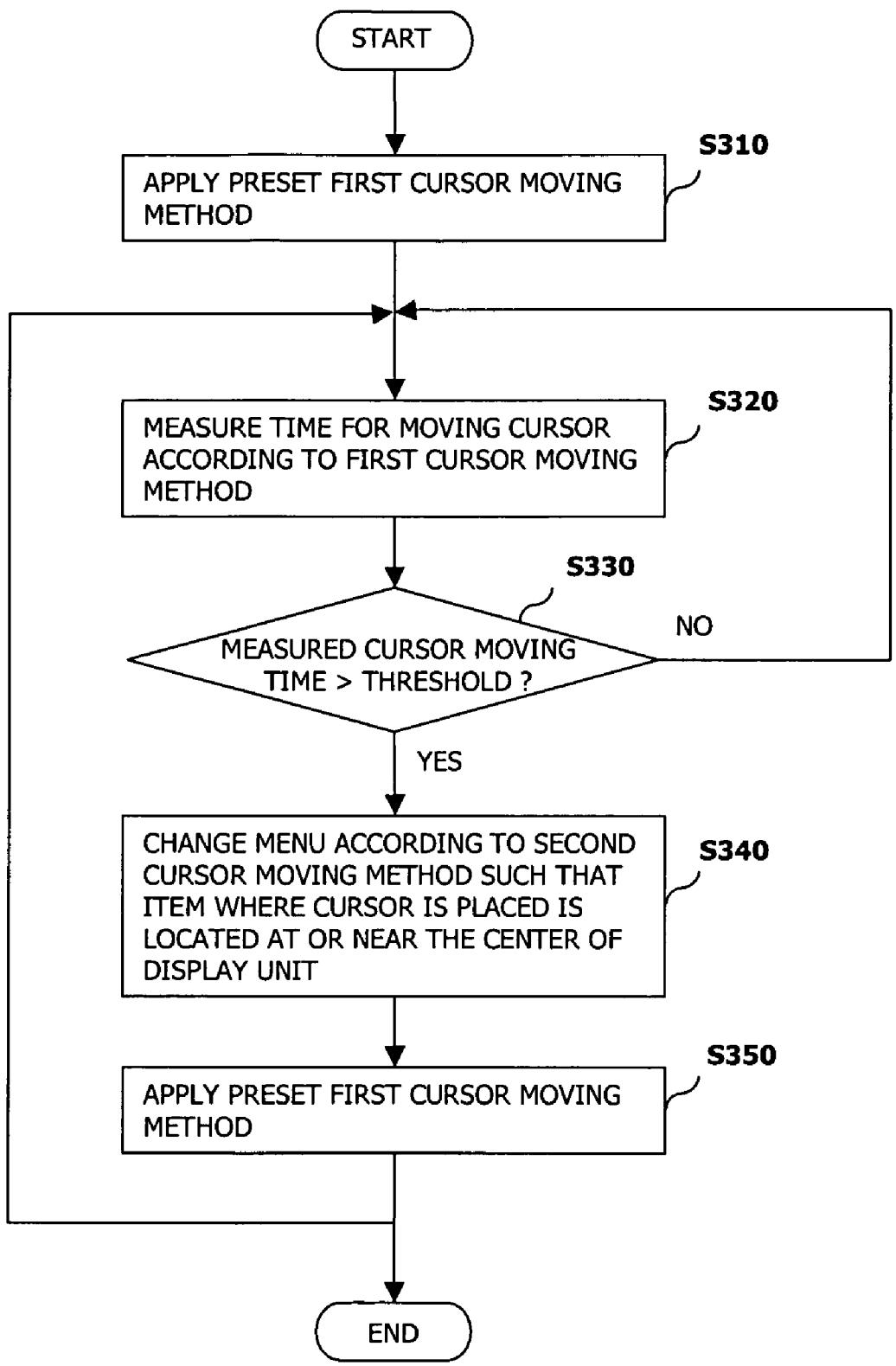
FIG. 3 is a flow chart that illustrates an exemplary method for navigating a menu in the display unit of an electronic device in accordance with the present invention.

FIG. 3 illustrates a flow chart of an exemplary method for navigating a menu in a display unit of an electronic device in accordance with the present invention. As illustrated in FIG. 3, the method includes applying a pre-set first cursor moving method when the selected menu is displayed (S310), measuring a time for moving the cursor according to the applied first cursor moving method (S320), determining whether the measured cursor moving time exceeds a pre-set threshold (S330), changing a menu such that an item on which the cursor is placed is located at or near the center of the display unit when the measured cursor moving time exceeds the threshold (S340), and applying the pre-set first cursor moving method after the changed menu is displayed (S350). The electronic device in accordance with the present invention may continue to apply the current first cursor moving method if the measured cursor moving time does not exceed the threshold.

The first cursor moving method may be a "moving cursor via pages" method and the second cursor moving method may be to a "moving body" method. However, it can be understood that other desired navigation methods may also be used.

When a menu or other information selected by the user is displayed on the display unit 400 of the electronic device, the cursor control unit 300 applies the pre-set first cursor moving method (S310). A menu displayed on the display unit 400 of the electronic device may be a menu in which one or more items are arranged vertically, such as from top to the bottom, or horizontally, such as from the left to the right. Furthermore, the items or the page containing the items may move, such as up and down or right and left, in a scrolling manner and/or the cursor may be moved to select one or more items.

The user can move the cursor on the displayed menu based on the applied first cursor moving method. The control unit 200 measures the time it takes the user to move the cursor using the key input unit 100 and outputs the measured cursor moving time to the cursor control unit 300 (S320). The cursor control unit 300 compares the cursor moving time with the pre-set threshold (S330).

If the cursor moving time exceeds the threshold, the cursor control unit 300 changes the menu according to the second cursor moving method, for example, to the "moving body" method, such that an item on which the cursor is placed is located at or relatively near the center of the display unit (S340). After the changed menu is displayed, the cursor control unit 300 may re-apply the pre-set first cursor moving method (S350).

If the cursor moving time does not exceed the pre-set threshold, the cursor control unit 300 may continue to apply the pre-set first cursor moving method as the cursor moving method. The principle of the operation of a cursor moving method will be described with reference to FIG. 4.

Figure 4:
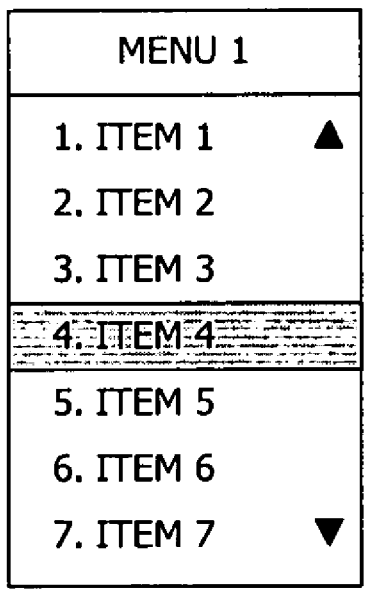
FIG. 4 illustrates a view for describing exemplary cursor moving methods used for the display unit of an electronic device in accordance with the present invention.
Figure 4:
Figure 4:
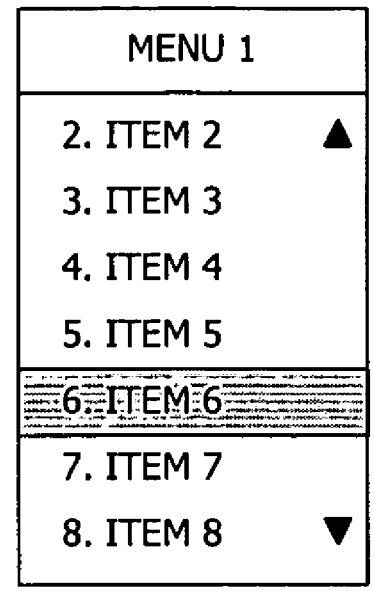
Figure 4:
Figure 4:
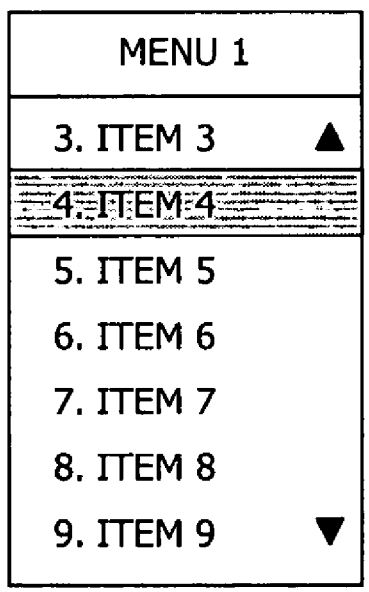
Figure 4:
Figure 4:
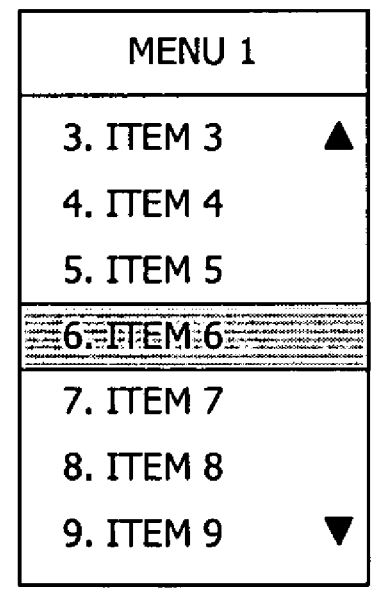

FIG. 4 illustrates a view for describing exemplary cursor moving methods applied to the display unit of the electronic device in accordance with the present invention. As illustrated in FIG. 4, when a menu selected by a user is displayed, the pre-set cursor moving method is applied such that the cursor can be moved to item 4 and then moved again to item 6 upon the user's input of an appropriate key(s). Specifically, FIG. 4 illustrates the "moving cursor" method as the pre-set cursor moving method and a cursor indicating an item of the displayed menu as a highlighted portion.

If the time it takes for the user to move the cursor exceeds the pre-set threshold, the method of navigating the menu can be changed to the second cursor moving method such that the cursor is placed at or relatively near the center of the display unit. Therefore, item 6 can be displayed as being located at or near the center of the display unit and the items 3 to 9 can be displayed at the screen edges the display unit. After the changed menu is displayed, the pre-set cursor moving method can be re-applied such that the cursor can be moved from item 6 to item 4 in an upward direction upon the user's inputting of the appropriate key(s). Specifically, FIG. 4 illustrates the "moving body" method as the second cursor moving method.

The present invention provides an apparatus for menu navigation on a graphical user interface, the apparatus including: a display screen adapted to display information and a cursor to a user; an input unit adapted to receive inputs from the user and to control movement of the cursor; and a processor cooperating with the display screen and the input unit to perform the steps of measuring a time it takes the user to control the cursor movement, displaying the information according to the measured time, and allowing subsequent cursor movements according to the measured time duration.

The cursor can be a graphical indication that allows the user to distinguish certain displayed information from other displayed information. The information can be displayed as a menu having a vertical or horizontal orientation. The cursor can be indicated as a highlighted portion that distinguishes one or more items in the menu format.

The input unit can receive audible inputs or tactile inputs from the user. The processor can display the information at a central portion on a screen of the display unit.

Subsequent cursor movements can allow the information and the cursor to be displayed as if they move relative to each other. The information and cursor can be displayed such that the information appears to move while the cursor is stationary or such that the cursor appears to move while the information is stationary.

As described herein, using the method and apparatus for navigating a menu in a display unit of an electronic device in accordance with the present invention, the time it takes for the user to move a cursor on a displayed menu is measured and one or more cursor moving methods are used according to the measured cursor moving time such that items at the upper and lower sides (ends) or the right and left sides (ends) relative to the cursor location can be displayed with the cursor being shown at or near the center (or other specified portion). The method and apparatus of the present invention allows approximately the same number of items to be displayed on the screen above and below the cursor (for a vertical menu) or left and right of the cursor (for a horizontal menu), thereby allowing the user to view as many items as possible in each navigation direction. Accordingly, user convenience and user friendliness when navigating various menus can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for navigating a menu in a display of an electronic device, the method comprising:
    displaying a list of a plurality of items of the menu in a first position;
    moving a cursor to select at least one item from the list of the plurality of items via the cursor;
    highlighting the selected at least one item;
    measuring a period of time from when the at least one item from the list was selected via the cursor;
    moving the list of the plurality of items to a second position if the measured period of time exceeds a predetermined threshold, wherein the second position is a position where an equal amount of items are displayed above and below a position of the at least one item, or left and right of the position of the at least one item.

2. The method of claim 1, wherein the list of the plurality of items is arranged vertically or horizontally.

3. The method of claim 1, wherein the first position is maintained if the measured period of time does not exceed the predetermined threshold.

4. The method of claim 3, wherein the cursor is moved according to a first cursor moving method selected from a group comprising a moving cursor method, a moving body method, or a moving cursor via pages method and wherein the moving cursor method enables the cursor to be moved vertically or horizontally on the menu, the moving body method enables the cursor to be fixed at a center region of the menu as the menu is moved vertically or horizontally, and the moving cursor via pages method divides the menu into a plurality of pages and enables the cursor to be moved vertically or horizontally within a single one of the plurality of pages.

5. The method of claim 4, wherein the first cursor moving method is the moving cursor method.

6. The method of claim 4, wherein the first cursor moving method is the moving cursor via pages method.

7. A method for navigating a menu in a display of an electronic device, the method comprising:
    displaying a list of a plurality of items of the menu in a first position and a cursor on a display;
    applying a default cursor moving method for moving the cursor on the display;
    selecting at least one item from the list of the plurality of items via the cursor;
    measuring a time for moving a cursor on the display according to the default cursor moving method;
    executing a second cursor moving method if the measured time exceeds a predetermined threshold, wherein the second cursor moving method positions the list of the plurality of items in a second position where an equal amount of items are displayed above and below the at least one selected item, or left and right of the at least one selected item; and
    executing the default cursor moving method sequentially after the second cursor moving method positions the list of the plurality of items in the second position.

8. The method of claim 7, wherein the list of the plurality of items is arranged vertically or horizontally.

9. The method of claim 7, wherein the default cursor moving method is maintained if the measured time does not exceed the predetermined threshold.

10. The method of claim 9, wherein the default cursor moving method comprises either a moving cursor method or a moving cursor via pages method, wherein the moving cursor method enables the cursor to be moved vertically or horizontally on the menu, and the moving cursor via pages method divides the menu into a plurality of pages and enables the cursor to be moved vertically or horizontally within a single one of the plurality of pages.

11. An apparatus for navigating a menu in a display of an electronic device, the apparatus comprising:
    a display unit for displaying a list of a plurality of items in the menu in a first position and a cursor on the display;
    an input unit adapted to receive input from a user and to control movement of the cursor on the display in order to select at least one item from the list of the plurality of items; and
    a processor adapted to measure a time to move the cursor according to a first cursor moving method and apply a second cursor moving method if the measured time exceeds a predetermined threshold, wherein the second cursor moving method positions the list of the plurality of items in a second position where an equal amount of items are displayed above and below the at least one selected item, or left and right of the at least one selected item.

12. The apparatus of claim 11, wherein the processor is further adapted to control the display unit such that the cursor is displayed at a central portion of the display when the second cursor moving method positions the list of the plurality of items in the second position.

13. The apparatus of claim 11, wherein the display unit is further adapted to display the list of the plurality of items vertically or horizontally.

14. The apparatus of claim 11, wherein the display unit is further adapted to highlight at least one item selected from the list of the plurality of items.

15. The apparatus of claim 11, wherein the input unit is further adapted to receive either audible user inputs or tactile user inputs.

16. The apparatus of claim 11, wherein the processor is further adapted to maintain the first cursor moving method if the measured time does not exceed the predetermined threshold.

17. The apparatus of claim 16, wherein the processor is further adapted to select the first cursor moving method from a group comprising a moving cursor method, a moving body method and a moving cursor via pages method.

18. The apparatus of claim 17, wherein the first cursor moving method is the moving cursor method.

19. The apparatus of claim 17, wherein the first cursor moving method is the moving cursor via pages method.

20. A mobile terminal for navigating a menu in a display, the mobile terminal comprising:
- a display adapted to display a list of a plurality of items in the menu in a first position and a cursor on the display;
- an input unit adapted to receive input from a user and to control movement of the cursor on the display to select at least one item from the list of the plurality of items via the cursor; and
- a processor adapted to measure a period of time from when at least on time from the list was selected via the cursor and move the list of a plurality of items to a second position if the measured time exceeds a predetermined threshold, wherein the second position is a position where an equal amount of items are displayed above and below the position of the at least one selected item, or left and right of the position of the at least one selected item.

* * * * *